May 17, 1949. U. S. FELSING 2,470,242
LIFT ATTACHMENT FOR TRACTOR DRAWBARS
Filed May 15, 1946
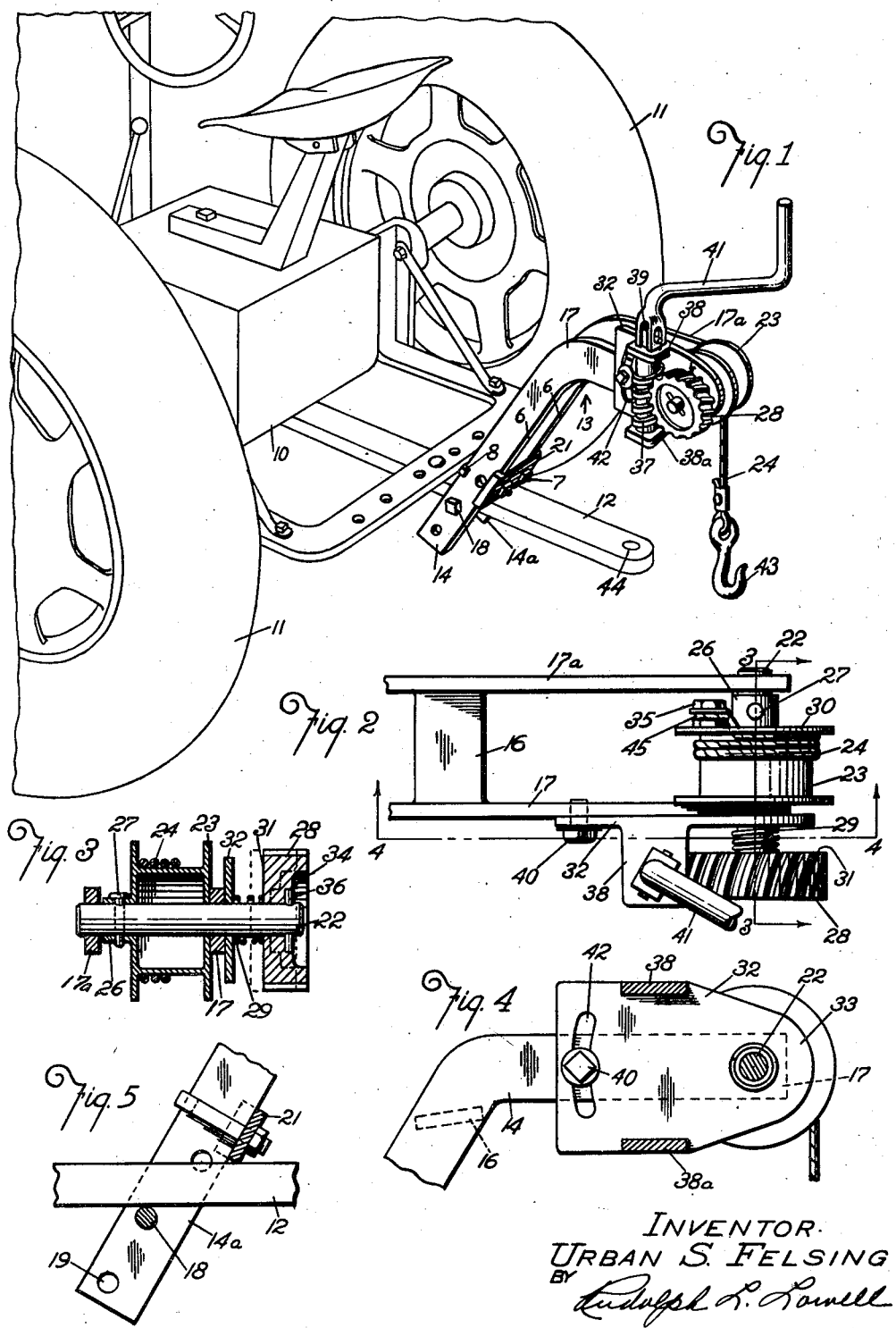
INVENTOR.
URBAN S. FELSING
BY
Rudolph L. Lowell
ATTY Patented May 17, 1949

2,470,242

UNITED STATES PATENT OFFICE 2,470,242

LIFT ATTACHMENT FOR TRACTOR DRAWBARS

Urban S. Felsing, Chosen, Fla.

Application May 15, 1946, Serial No. 669,958

5 Claims. (Cl. 254—166)

1

This invention relates generally to lift devices and in particular to a lift attachment for the drawbar of a tractor adapted to elevate a hitch portion on a trailing unit to a position for a coupling connection with the drawbar.

In the coupling of a farm machine, such as a combine, cornpicker or any machine having a heavy tongue, considerable difficulty is encountered in lifting the tongue to the elevation of a tractor drawbar for coupling purposes. This operation usually requires two men, or if attempted by one man, a lifting jack for raising the heavy machine tongue. When two men are used injury often results to the man on the ground because of the weight to be lifted and the danger of his fingers being caught between the tractor tongue and the machine tongue as the tractor is maneuvered relative to the tongue.

In the use of a jack, the support of the machine tongue at an elevated position is generally unstable so that the tongue readily falls or slips from the jack, if either the tongue or the jack is struck by the tractor as the tractor is being operated to a connecting position with the tongue.

It is an object of this invention, therefore, to provide an improved lift attachment for a tractor drawbar for elevating a trailer tongue into a coupling position with the drawbar.

Another object of this invention is to provide a lift attachment for a tractor drawbar which is releasably supported on the tractor drawbar so that it can be readily removed from the tractor on completion of a lifting operation.

A further object of this invention is to provide a lift attachment for a tractor drawbar which is light in weight easily handled by one man, and safely operated to elevate the tongue of a trailer machine for connection with the tractor drawbar.

Another object of this invention is to provide a lift attachment for a tractor drawbar which is capable of raising and pulling the tongue of a trailer machine into a coupling position with the drawbar so as to eliminate any initial "spotting" of the tractor relative to the trailer for coupling purposes.

A feature of this invention is found in the provision of a lift attachment for a tractor drawbar, in which a standard or frame is adapted to be releasably connected in an upright position on the tractor drawbar. A winding drum at the upper end of the frame carries a cable, which is attachable with the tongue of the machine to be drawn, and elevated and lowered on rotation of the drum.

2

Further objects, features and advantages of this invention will become apparent from the following description when taken in connection with the accompanying drawings in which:

Fig. 1 is a perspective view of the rear portion of a tractor showing the lift attachment of this invention in assembly relation with the tractor drawbar;

Fig. 2 is a fragmentary plan view of the lift attachment shown in Fig. 1;

Fig. 3 is a sectional view as seen on the line 3—3 in Fig. 2; and

Fig. 4 is a sectional view taken on the line 4—4 in Fig. 2; and

Fig. 5 is a detail sectional view of adjustable means for supporting the attachment on the tractor drawbar.

With reference to the drawings the lift attachment of this invention is illustrated in Fig. 1 in assembly relation with a tractor including a rear axle 10, rear traction wheels 11, and a longitudinal drawbar 12 supported on and extended rearwardly from the axle 10.

The lift attachment for the drawbar 12 includes a frame or standard, designated generally as 13, which has a pair of transversely spaced inverted L-shaped members 14 and 14a connected intermediate their ends by a brace 16 (Figs. 1, 2 and 4). As best appears in Figs. 1 and 5 the lower ends of the L-frame members 14 and 14a are adapted to straddle the drawbar 12, with their short legs or lateral arms 17 and 17a extended rearwardly from the tractor and positioned above the rear end of the tractor drawbar 12.

The frame 13 is releasably supported in an upright position on the drawbar 12 by means including a pin or bolt 18 (Figs. 1 and 5) extended transversely of the frame 13 through one pair of oppositely arranged holes 19 formed in the lower ends of the frame members 14 and 14a. Spaced vertically upwardly from the pin 18 is a transverse clamp member 21 engageable with the rear edges 6 of the frame members 14 and 14a and provided with clamping bolts 7 having hooks 8 at their forward ends for engaging the front edges of the frame members 14 and 14a. By merely loosening the bolts 7, therefore, the clamping member 21 is vertically adjustable on the frame members 14 and 14a relative to the pin 18.

In the assembly of the lift attachment with the drawbar 12 it is contemplated that the distance between the clamp 21 and the pin 18 be sufficient to accommodate the thickness of the drawbar 12, so that the drawbar 12 can be inserted between the pin 18 and the clamp 21. With the frame 13 thus initially carried on the drawbar the pin 18 engages the under side of the drawbar, while the clamp 21 engages the top side of the drawbar so that the frame 13 is supported in an upright position on the drawbar. By changing the location of the pin 18 in the openings 19 and correspondingly adjusting the clamp 21, the vertical height of the frame 13 above the drawbar 12 can be varied.

Adjustment of the clamp 21 relative to the pin 18 not only provides for the accommodation of the frame 13 and drawbars 12 of different thicknesses, but also provides for the support of the frame 13 such that the lateral arms 17 to 17a are in a substantially horizontal plane. In other words, with the pin 18 in a fixed position, adjustment of the clamp 21 upwardly of the frame 13 increases the angle of inclination of the frame in a rearward direction, while adjustment of the clamp 21 towards the pin 18 reduces its rearward angle of inclination.

Rotatably supported adjacent the free or rear ends of the lateral arm members 17 and 17a is a transverse shaft 22 (Figs. 2 and 3). A winding drum 23, rotatable on the shaft 22 between the arm members 17 and 17a, has a hub 26 adjacent to the arm 17a. A pin 27 extended through the hub 26 and the shaft 22 connects the drum 23 for rotation with the shaft. Adapted to be wound on the drum 23 is a cable 24 having one end 45 extended through and secured to the outside of the drum face 30 by a bolt 35. The opposite end of the cable carries a hook 43 to provide for its connection with a tongue of a trailer machine (not shown).

The shaft 22 is rotated, to wind and unwind the cable or flexible lifting means 24 relative to the drum 23, by means including a driven worm gear 28 mounted on the shaft 22 to the outside of the lateral arm 17 (Figs. 2 and 3). A coil spring 29 is arranged in compression between the inner face 31 of the gear 28, and a pivoted supporting arm 32 pivotally supported at one end 33 on the shaft 22 to the outside of the arm 17. The outer face of the gear 28 is formed with a groove 34 adapted to receive a pin 36 extended transversely through the shaft 22, to connect the gear for rotation with the shaft 22. This connection is releasably maintained by the coil spring 29.

On movement of the gear 28 inwardly, or to the left as viewed in Fig. 3, against the action of the spring 29, the pin 36 is removed from the slot 34 to disconnect the gear 28 from the shaft 22. With the gear 28 held in its dotted line position shown in Fig. 3 the drum 23 and the shaft 22 are rotatable independently of the gear 28 to provide for a free winding and unwinding of the cable 24.

The gear 28 is in driven engagement with a worm 37 (Fig. 1) rotatably supported in upper and lower bearings 38 and 38a, respectively, extended laterally outwardly from the pivoted arm 32. The upper end 39 of the worm 37 projects from the top bearing 38 and is adapted for releasable engagement with a crank handle 41.

The free end of the pivoted arm 32 (Figs. 1 and 4) is formed with an arcuate slot 42 concentric with the axis of the shaft 22. A bolt 40 threadable in the lateral arm 17 and extended through the slot 42 is adapted to hold the arm 32 in a pivotally moved position, with this adjustment providing for a movement of the worm 37 relative to the gear 28 to provide a clearance of the crank handle 41 with the rear end of the tractor.

The lift attachment may be assembled on the drawbar 12 by initially inserting the drawbar between the pin 18 and the clamp 21, or by removing the pin and arranging the lower ends of the transverse frame members 14 and 14a in a straddled relation with the drawbar 12 and then inserting the pin 18 between such frame members to engage the under side of the drawbar 12. With the attachment supported on the drawbar 12, by virtue of the engagement of the clamp 21 with the top side of the drawbar and the engagement of the pin 18 with the underside of the drawbar, the clamp 21 is adjusted longitudinally of the frame members 14 and 14a to position the lateral arms 17 and 17a, in a substantially horizontal plane. The pivoted arm 32 is then adjusted to clear the crank handle 41 with the tractor.

In the operation of the lift attachment assume the cable 24 to be wound about the drum 23. The gear 28 is moved to its dotted line position shown in Fig. 3 and the cable 24 unwound from the drum 23 by merely pulling on the cable 24 until a desired cable length is available for attaching the cable with the trailer tongue (not shown) to be connected with the drawbar 12. The gear 28 is then connected for rotation with the shaft 22.

With the trailer tongue attached to the cable 24 the crank 41 is operated to raise the trailer tongue to a position relative to the drawbar 12 such that a usual coupling pin (not shown) may be inserted through holes in the trailer tongue adapted for alignment with the hole 44 at the rear end of the drawbar 12. On completion of the coupling operation the cable 24 is disconnected from the trailer tongue and wound in a storage position on the reel 23 and the lift attachment maintained on the drawbar 12. In the event it is desired to remove the lift attachment it is only necessary to remove the pin 18 and lift the attachment from the drawbar 12.

It is readily apparent that even though the trailer tongue may initially be remotely located from the drawbar 12 the cable 24 may be extended to reach the trailer tongue. On winding of the cable 24 the trailer tongue is pulled or moved toward the drawbar 12 concurrently with the lifting of the tongue to a coupling position with the drawbar. As a result any "spotting" of the tractor relative to the trailer unit is completely eliminated.

From a consideration of the above description it is seen that the invention provides a lift attachment for a tractor drawbar which is of a rigid but light construction, and safely and easily handled by one man to lift relatively heavy trailer units to a coupling position with the tractor drawbar. The attachment is releasibly supported on the tractor drawbar and adapted to fit drawbars of different sizes. Further the attachment of this invention eliminates the usual danger of getting fingers caught between the tractor drawbar and the trailer tongue during a coupling operation, and the need of two men for the coupling operation.

Although the invention has been described with respect to a preferred embodiment thereof it is to be understood that it is not to be so limited since changes and modifications can be made therein which are within the full intended scope of this invention as defined by the appended claims.

I claim:

1. A lift attachment for a tractor drawbar for elevating a machine to be pulled into a coupling position with the drawbar comprising, a pair of oppositely arranged transversely spaced upright frame members adapted to receive the drawbar therebetween, a pair of transverse vertically spaced support members adjacent one end of said frame members for engaging opposite sides of the drawbar to support said frame members in an upright position on said drawbar, a winding drum rotatably supported adjacent the other end of said frame members, a cable windable on said drum adapted for connection with the machine to be pulled, and means at said other end of the frame members for rotating said winding drum.

2. A lift attachment for a tractor drawbar for elevating the tongue on a trailer unit to a coupling position with the drawbar, said attachment comprising a frame structure having transversely spaced portions at one end adapted to be arranged in a straddled relation with said drawbar, means on said transversely spaced portions for engaging opposite sides of the drawbar to support said frame structure in an upright position on the drawbar, laterally extended portions at the opposite end of said frame structure, a winding drum rotatably supported between the free ends of said lateral portions, means for rotating said winding drum, and flexible means windable on said drum and adapted for connection with said tongue.

3. A lift attachment for a tractor drawbar comprising an upright frame structure including a pair of oppositely arranged transversely spaced frame members adapted to receive the drawbar between one of their ends, a pair of transverse vertically spaced members connected between said one ends for engaging opposite sides of the drawbar to support said frame structure in an upright position on the drawbar, laterally extended portions at the other ends of said frame members, a winding drum rotatably supported between said laterally extended portions, means for rotating said winding drum, and flexible means windable on said drum adapted for connection with a hitch portion on a trailer unit.

4. A lift attachment for a tractor drawbar comprising a pair of transversely spaced frame members having laterally extended portions adjacent one of their ends, with their other ends being adapted to straddle the drawbar, a pair of vertically spaced transverse members extended between said other ends for engaging opposite sides of the drawbar to support said frame members in an upright position on the drawbar, with one of said transverse members being adjustably movable longitudinally of said frame members, a winding drum rotatably supported between said laterally extended portions, and flexible means windable on said drum and adapted for connection with a trailer unit.

5. A lift attachment for a tractor drawbar comprising a frame structure, lifting means at one end of said frame structure adapted for connection with a trailer unit, means for supporting said frame structure in an upright position on said drawbar including a pair of transversely spaced members at the other end of said frame structure adapted to straddle the drawbar, and vertically spaced transverse members extended between said transversely spaced members for engaging opposite sides of the drawbar.

URBAN S. FELSING.

REFERENCES CITED

The following references are of record in the file of this patent:

UNITED STATES PATENTS

| Number | Name | Date |
| --- | --- | --- |
| 1,270,104 | Benton and Vest | June 18, 1918 |
| 1,381,337 | Rippe | June 14, 1921 |
| 1,803,400 | Moore | July 2, 1927 |
| 2,398,147 | McKay | Apr. 9, 1946 |